United States Patent
Kuronita et al.

(10) Patent No.: US 7,831,370 B2
(45) Date of Patent: Nov. 9, 2010

(54) APPARATUS FOR CONTROLLING INJECTION OF FUEL INTO ENGINE AND APPARATUS FOR CONTROLLING COMBUSTION IN ENGINE

(75) Inventors: Tokuji Kuronita, Kariya (JP); Satoru Sasaki, Kariya (JP)

(73) Assignee: Denso Corporation, Kariya (JP)

( * ) Notice: Subject to any disclaimer, the term of this patent is extended or adjusted under 35 U.S.C. 154(b) by 393 days.

(21) Appl. No.: 12/015,043

(22) Filed: Jan. 16, 2008

(65) Prior Publication Data
US 2008/0172169 A1    Jul. 17, 2008

(30) Foreign Application Priority Data
Jan. 17, 2007  (JP)  ............... 2007-007732

(51) Int. Cl.
*G06F 19/00* (2006.01)
*F02B 3/00* (2006.01)

(52) U.S. Cl. ............ 701/103; 701/114; 701/115; 123/299

(58) Field of Classification Search ......... 701/103–109, 701/114, 115; 123/299, 304, 305
See application file for complete search history.

(56) References Cited

U.S. PATENT DOCUMENTS

| | | | | |
|---|---|---|---|---|
| 4,130,095 A | * | 12/1978 | Bowler et al. | 123/675 |
| 5,852,994 A | * | 12/1998 | Tsuzuku et al. | 123/308 |
| 6,148,794 A | * | 11/2000 | Tsuzuku et al. | 123/406.5 |
| 6,732,705 B2 | * | 5/2004 | Ebelsheiser et al. | 123/299 |
| 7,021,277 B2 | * | 4/2006 | Kuo et al. | 123/299 |
| 7,191,590 B2 | * | 3/2007 | Nagaoka et al. | 60/285 |
| 7,337,762 B2 | * | 3/2008 | Eng et al. | 123/295 |
| 7,640,912 B2 | * | 1/2010 | Lewis et al. | 123/304 |
| 2006/0016422 A1 | * | 1/2006 | Kuo et al. | 123/299 |
| 2007/0107692 A1 | * | 5/2007 | Kuo et al. | 123/305 |

FOREIGN PATENT DOCUMENTS

JP    2004-100559    4/2004

* cited by examiner

*Primary Examiner*—John T Kwon
(74) *Attorney, Agent, or Firm*—Nixon & Vanderhye P.C.

(57) ABSTRACT

An apparatus is provided to control injection of fuel into an engine with a combustion engine. The fuel is injected into the combustion chamber as a preliminary sub injection and a main injection following the preliminary sub injection. The preliminary sub injection repeats one or more times and is less in an amount of the fuel than the main injection. The apparatus comprises acquisition means and a control unit. The acquisition means acquires a parameter showing at least one of a state of an exhaust gas exhausted from the cylinder after the combustion of the fuel and a constituent of the exhaust gas. The control unit includes variably setting means for variably setting a mode of the preliminary sub injection depending on the parameter acquired by the acquisition means.

22 Claims, 8 Drawing Sheets

APPARATUS FOR CONTROLLING INJECTION OF FUEL INTO ENGINE AND APPARATUS FOR CONTROLLING COMBUSTION IN ENGINE

CROSS REFERENCES TO RELATED APPLICATION

The present application relates to and incorporates by reference Japanese Patent Application No. 2007-7732 filed on Jan. 17, 2007.

BACKGROUND OF THE INVENTION

1. Field of the Invention

The present invention relates to an apparatus for controlling injection of fuel into an engine and an apparatus for controlling combustion in an engine, and in particular, to the apparatuses in which the injection includes a preliminary sub Injunction preceding a main injection for producing the output torque in the engine and being less in an fuel amount to be injected than the main injection.

2. Description of the Related Art

An engine (internal combustion engine) is used as a power source in automotive vehicles. In this engine, fuel injected by fuel injection valves (for example, injectors) is ignited for combustion, so that output torque is generated from the engine.

Recently, in a diesel engine for vehicles, an injection technique, called multiple-step injection, has been put to practical use. In the injection based on this technique, a preliminary sub injection is carried out before the main injection primarily that produces the output torque of the engine during each combustion cycle. This preliminary sub injection is designed to inject a smaller amount of fuel than that of the main injection. That is, the fuel amount in the preliminary sub injection is part of the whole amount of fuel to be injected per combustion cycle. This preliminary sub injection is called "pilot injection." When being performed, this pilot injection generates heat in the combustion chamber of each cylinder to warm the inner wall thereof. Thus, with the wall thereof sufficiently heated, the main injection is performed, thus reducing delay in the ignition of the main injection, thus suppressing combustion noise due to the ignition delay. Therefore, the diesel engine is able to provide improved running operation in a lower-speed and lower-load running range which appears in an idling operation, for instance. Additionally, the fuel injection is divided between the pilot injection and the main injection, which results in that a premixing amount of fuel is reduced and a certain amount of air-fuel mixture is burned in the initial combustion. The combustion gas is thus kept at lower temperatures, which makes partly suppresses the initial combustion of the main injection and reduces the emission of NOx (nitrogen oxide) from the engine.

However, there is a problem that the effect of the pilot injection is liable to changes in the environmental conditions, because the pilot injection needs only a minute amount of fuel. To cover this difficulty, a map is prepared beforehand in a memory device and optimum injection patterns are written for every engine operating state. For preparing this kind of map, experiments and/or simulations are conducted to obtain such optimum injection patterns. Reference is made to this map to set an appropriate injection patter depending on each engine operating state.

However, it will take a larger amount of labor (in man-hours) to make such maps (called the "matching map"), prolonging the work and increasing manufacturing costs. Further, the matching map is not able to follow changes in the characteristics of the engine which will probably occur with long use of the engine. That is, with an increase in the use time, the memorized injection patterns will deviate from optimum injection patterns to the current engine conditions. If this happens, the combustion amount and combustion temperature of fuel in response to the pilot and main injections will be shifted from their reference values. The combustion timing is also subjected to a shift, giving rise to a deteriorated emission quality and unstable combustion states.

In consideration of this difficulty, Japanese Patent Application Laid-open Publication No. 2004-100559 discloses an apparatus in which CPS (cylinder pressure sensor) is used to detect the cylinder pressure during the operation of an engine and this pressure is used to calculate combustion parameters for the combustion start timing and other timings. The calculated combustion parameters are then used to adjust the fuel amount and timing of the pilot injection.

However, the apparatus according to the foregoing conventional publication is still confronted with a drawback. This results from the fact that the amount injected by the pilot injection is minute. When burned, the minute fuel amount will cause only small changes in the cylinder pressure, with the result that it is considerably difficult to detect combustion states in response to such pressure changes Additionally, the CPS is generally expensive, and being disadvantageous in reducing the whole manufacturing costs of the apparatus.

SUMMARY OF THE INVENTION

The present invention has been made in consideration of the above conventional situations, and has an object to provide an engine fuel injection control apparatus and an engine combustion control apparatus, which are able to control the combustion in the engine to desired states easily and accurately.

As one mode of the present invention, there is provided an apparatus for controlling injection of fuel into an engine with a combustion chamber, wherein the fuel is injected into the combustion chamber as a preliminary sub injection and a main injection following the preliminary sub injection, the preliminary sub injection repeating one or more times and being less in an amount of the fuel than the main injection, the apparatus comprising: acquisition means that acquires a parameter (combustion parameter) showing at least one of a state of an exhaust gas exhausted from the cylinder after the combustion of the fuel and information in relation to a constituent of the exhaust gas; and a control unit that includes variably setting means for variably setting a mode of the preliminary sub injection depending on the parameter acquired by the acquisition means. The information in relation to the constituent includes the type, amount, and/or ratio of the constituent(s) contained in the exhaust gas.

In the diesel engine, for example, the preliminary sub injection with a minute amount of fuel is carried out before the main injection. The present inventors' knowledge shows that, in this kind of injection system, how much the preliminary sub injection affects the main injection appears as differences in values of the parameters showing the characteristics of the exhaust gas. Practically, combustion parameters (such as a fuel amount to be burned and combustion timing) showing the combustion in response to the main injection is generally changed depending on changes in modes of the preliminary sub injection. The modes include duration of each injection, a injection timing, and/or injection pattern including the interval between specified injections. Additionally, the inventors' knowledge shows that changes in the values of the combustion parameters appear in changes in exhaust parameters (such as the temperature of the exhaust gas, the pressure of the exhaust gas, and, the types, amounts, and ratios of constituents such as O2, HC and NOx contained in the exhaust gas). That is, it has been found that the changes in the values of the combustion parameters can be estimated from examining the exhaust parameters with precision. The basic concept of the present invention is based on this inventors' knowledge. Therefore, according to the foregoing basic structure of the present invention, the engine combustion states can be controlled to desired ones easily and accurately, without using the conventional matching map and cylinder pressure information. In particular, for reducing irregularities in the combustion states, it is also preferred that the exhaust parameters are converted to errors compared to a predetermined reference combustion state and the converted errors are compensated for by variably setting the modes of the preliminary sub injection.

As another aspect of the present invention, there is provided an apparatus for controlling a combustion state of fuel in a cylinder of an engine equipped with an output shaft driven to rotate by torque generated by the combustion of the fuel, comprising: acquisition means for acquiring a parameter showing at least one of a state of an exhaust gas exhausted from the cylinder after the combustion of the fuel and a constituent of the exhaust gas; and setting means for setting the parameter acquired by the acquisition means such that the parameter is able to be used for the control of the combustion state of the fuel.

DETAILED DESCRIPTION OF THE PREFERRED EMBODIMENTS

Referring to FIGS. 1-10, an embodiment of the fuel injection control apparatus and the combustion control apparatus according to the present invention will now be described.

Figure 1:
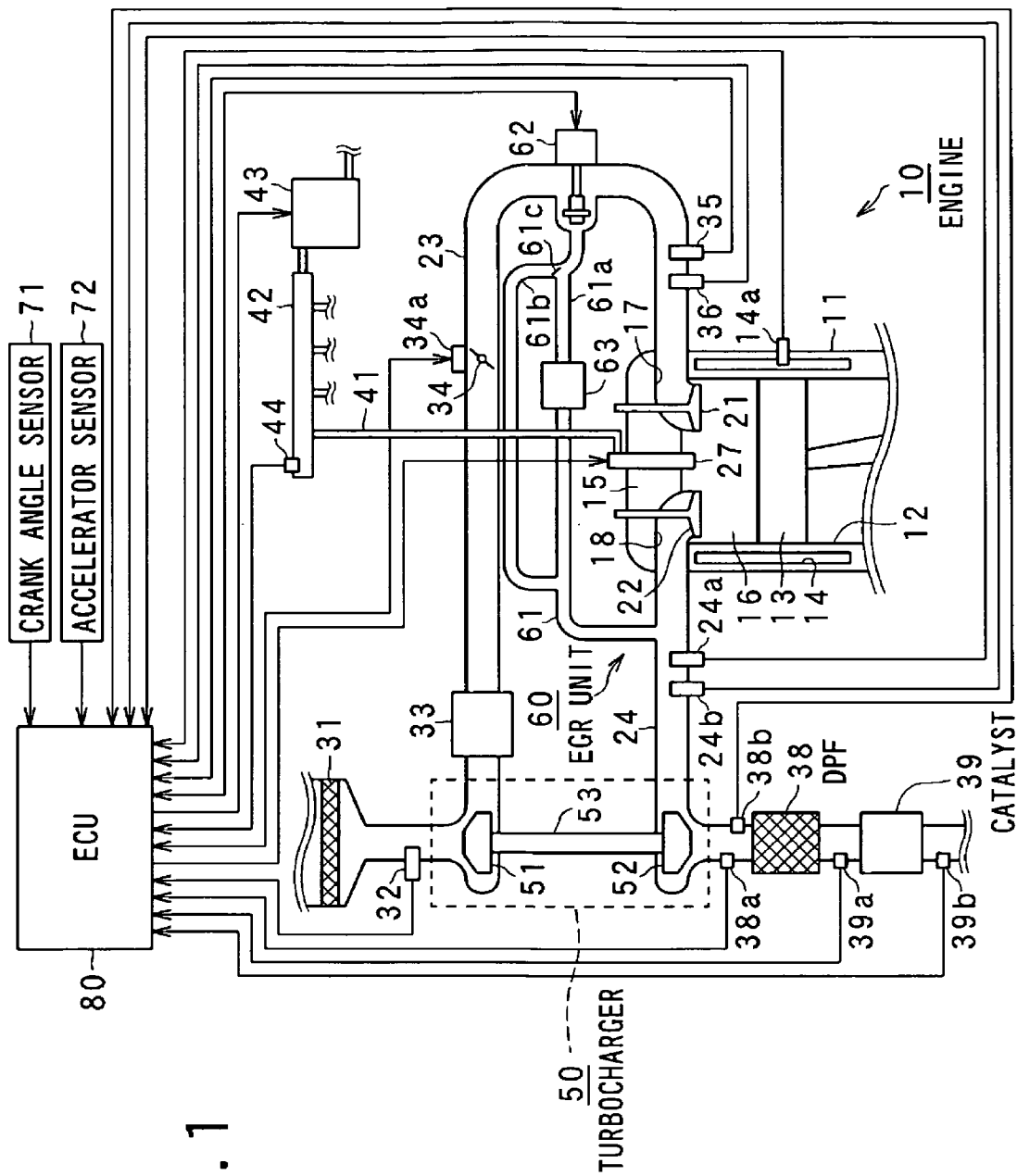
FIG. 1 is an illustrative view outlining the configuration of an engine fuel control system to which both a fuel injection control apparatus and a combustion control apparatus according to an embodiment of the present invention are applied as examples thereof.

FIG. 1 shows a combustion control apparatus for engines according to the present invention.

In the present embodiment, the fuel injection control apparatus according to the present invention is put into operation functionally in the combustion control apparatus, which is directed to a multiple cylinder type of engine 10 (for example, a 4 cylindered four-wheel vehicles), of which configuration is illustrated in FIG. 1. In this figure, however for the sake of a simplified explanation, a control system for only one cylinder is shown.

The injection of fuel into the engine 10 includes a main injection for primarily producing output torque during one combustion cycle and a preliminary sub injection, hereinafter called the "pilot injection." The pilot injection is carried out prior to the main injection and injects a smaller amount of fuel than that in the main injection.

The engine 10 according to the present embodiment is a reciprocating diesel engine provided with a common rail type of fuel injection apparatus. Thus, the combustion control apparatus is provided with an ECU (electrical control unit) and various sensors, which will now be described.

The engine 10 includes a cylinder block 11 in which cylinders 12 are provided (in FIG. 1, only one cylinder 12 is depicted). In each cylinder 12, a piston 13 is contained so that it reciprocate to rotate a crank shaft (not shown) serving as an output shaft.

At the cylinder block 11, there are provided a cooling water passage 14 and a cooling-water temperature sensor 14a. The cooling water passage 14 allows cooling water to pass such that it circulates through the engine 10 for cooling. The sensor 14a is arranged to detect, as an electrical signal, the temperature of the cooling water in the passage 14. Further, the cylinder block 11 has an upper end face to which a cylinder head 15 is fixedly mounted so as to form a combustion chamber 16 between the cylinder head 15 and the top face of the piston 13.

The cylinder head 15 also comprises an intake port 17 (i.e., inlet) and an exhaust port 18 (outlet), both of which are disposed to open to the combustion chamber 16. The intake port 17 and exhaust port 18 can be opened and closed by an intake valve 21 and an exhaust valve 22, respectively, which are driven by not-shown cams. The cams are attached to a cam shaft that engages with the crank shafts. To make the combustion chamber 16 of each cylinder 12 communicate with the vehicle outside (i.e., outside air) via these ports, the intake port 17 is coupled with an intake pipe (intake manifold) 23 that takes the outside air (fresh air) in and the exhaust port 18 is coupled with an exhaust pipe (exhaust manifold) 24 that exhausts the combustion gas The engine 10 comprises an intake system, part of which is composed of the intake pipe 23 into which the fresh air is fed by way of an air cleaner 31 in which the air is subjected to removal of contaminations contained therein. The air cleaner 31 is disposed at the highest upstream part of the intake pipe 23. At a part of the intake pipe 23, which is more downstream than the air cleaner 31, an air flow meter 32 is provided which detects the amount of fresh air (fresh air amount) and outputs an electrical signal depending on the detected air amount. The air flow meter 32 is for example a hot wire type of air flow meter. Further, at another part of the intake pipe 23, which is more downstream than this air flow meter 32, an intercooler 33 is provided which cools the air that has been taken in. At another part of the intake pipe 23, which is more downstream than this intercooler 33, there are provided an electronically controlled throttle valve 34 and a throttle opening sensor 34a. The throttle valve 34 is configured such that its opening is adjusted by an electronic actuator including a DC motor. The sensor 34a is placed to detect the opening and movements (fluctuations in its opening) of this throttle valve 34 and outputs an electrical signal depending on the detected results. At more downstream parts of the intake pipe 23, there provided an intake pressure sensor 35 to detect the pressure of the taken-in air as an electronic signal depending on the detected pressure and an intake air temperature sensor 36 to detect the temperature of the taken-in air as an electronic signal depending on the detected temperature.

In addition, the engine 10 comprises an exhaust system part of which is the exhaust pipe 24. At parts near to the exhaust port 18 in the exhaust pipe 24, there are provided an exhaust pressure sensor 24a and an exhaust-gas temperature sensor 24b. Of these, the exhaust pressure sensor 24a detects the pressure of exhausted gas and outputs an electrical signal depending on the detected exhausted pressure. The exhaust-gas temperature sensor 24b detects the temperature of the exhausted gas and outputs an electrical signal depending on the detected temperature. At more downstream parts in the exhaust pipe 24, there are provided a DPF (Diesel Particulate Filter) 38 and an NOx occlusion deoxidization type of catalyst (hereinafter, simply referred to as a "catalyst") 39 to remove NOx contained in the exhaust gas. The DPF 38, which is a post-exhaust processing system to purify the exhaust gas, is placed to collect PM (Particulate Matters) contained in the exhaust gas. In the present embodiment, the DPF 38 and the NOx catalyst 39 are arranged sequentially in this order toward the downstream end of the exhaust pipe 24.

The DPF 38 is a continuous production type of filter to remove the particulate matters from the exhaust gas, and can be continuously used by repeatedly burning and removing (reproduction) the collected particulate matters during post injections carried out after each main injection. In addition, DPF 38 holds a not-shown oxidation catalyst made of platinum-originated material and is able to remove HC and CO as well as fusible organic constituent (SOF) which is one of the PM components.

The NOx catalyst 39, which is made of, for example, alkaline earth metal material (occlusion material) and platinum, has a characteristic that, when the ambience of the exhaust gas is from a lean air/fuel ratio (a fuel/air ratio providing fuel percentages lower than a theoretical air/fuel ratio), the catalyst performs the occlusion of NOx from the exhaust gas, while when the fuel/air ratio is rich (a fuel/air ratio providing fuel percentages higher than the theoretical air/fuel ratio), the catalyst performs reduction removal of the occlusion NOx with the aid of reduction components such as HC and CO in the exhaust gas. Enabling the NOx catalyst 39 to repeatedly perform the occlusion and reduction (discharge) of NOx makes it possible that the NOx in the exhaust gas is purified to reduce the amount of NOx to be discharged.

At a position in the exhaust pipe 24, which is more upstream than the DPF 38, two sensors are provided. These two sensors are an exhaust-gas temperature sensor 38a to detect the temperature of the exhaust gas and an A/F sensor 38b to detect the concentration of a gas, especially oxygen, contained in the exhaust gas. In the same way as above, at positions in the exhaust pipe 24, which are respectively more upstream and downstream than the NOx catalyst 39, two other A/F sensors 39a and 39b are arranged. The above three A/F sensors 38b, 39a and 39b are oxygen concentration sensors to detect the oxygen concentration and output an electrical signal according to the oxygen concentration in the exhaust gas. Based on these detection signals, an air-fuel ratio is calculated. These detected electrical signals are adjusted to be linear with regard to changes in the oxygen concentration. These sensors 38a, 38b, and 38c play a significant role in regenerative processes in the DPF 38 and NOx catalyst 39 in the way that the signals from those sensors define the start and end timings of the regenerative processes.

In the combustion chamber 16 of each cylinder 12, an injector 27 is also provided which serves as a fuel injection valve to inject fuel (diesel oil) to be combusted in the combustion chamber 16. In this embodiment, the injection is formed as electromagnetically driven type, but may be formed as piezoelectrically driven type. In FIG. 1, for the sake of simplifying the explanation, the injector 27 arranged at only one cylinder 12 is illustrated, but practically all the cylinders 12 comprises the respective injectors 27. Each injector 27 is mechanically connected to a common rail 42, which acts as an accumulator, via a high-pressure fuel pipe 41. This common rail 42 always receives high-pressure fuel from a fuel pump 43 so that the common rail 42 stores therein the high-pressure fuel of which pressure corresponds to the injection pressure. A fuel pressure sensor 44 which detects fuel pressure within the common rail 42 is provided at the common rail 42. The fuel pressure sensor 44 outputs an electric signal indicating the detected fuel pressure. The fuel pressure is equal to pressure in the common rail 42 (i.e., common rail pressure), whereby the original pressure of the fuel to be injected can be monitored.

In the engine 10, by opening the valves of the respective injectors 27, a specified amount of fuel (high-pressure fuel) is supplied into the respective cylinders 12 at the necessary timing. To be specific, when the engine 10 is under operation, the air is introduced into the combustion chamber 16 of each cylinder 12 from the intake pipe 23 in response to the open of the intake valve 21. The air which has taken in is then mixed with fuel injected from the injector 27 to produce an air-fuel mixture. This air-fuel mixture is then subjected to compression by the piston 13 within the cylinder 12 so as to ignite (self-ignition), whereby the fuel combusts. Then the exhaust valve 22 is made to open to allow exhausted gas yielded by the combustion to be exhausted into the exhaust pipe 24. That is, the engine 10 is a four-stroke engine, in which the four strokes consisting of intake, compression, combustion, and exhaust strokes, which compose one combustion cycle to be carried out repeatedly at intervals of "720° CA."

The present system is further provided with a turbocharger 50 disposed between the intake pipe 23 and the exhaust pipe 24. This turbocharger 50 comprises an intake compressor 51 and an exhaust turbine 52 which are coupled with each other by a shaft 53. The intake compressor 51 is disposed between the air flow meter 32 and the intercooler 33 in the intake pipe 23, while the exhaust turbine 52 is disposed at a position in the exhaust pipe 24, which is more upstream than the exhaust-gas temperature sensor 38a. The exhaust gas flowing through the exhaust pipe 24 rotates the exhaust turbine 52, so that the rotational force is transmitted to the intake compressor 51 via the shaft 53. Hence the intake compressor 51 compresses the air that flow through the intake pipe 23 so as to supercharge the air. This supercharging raises the efficiency of charging each cylinder 12 with the taken-in air. During this supercharging, the supercharged air is cooled down in the intercooler 33, whereby the charge efficiency of the air at each cylinder 12 increases more.

As illustrated in FIG. 1, an EGR (Exhaust Gas Recirculation) unit 60 is also provided to connect both the intake and exhaust pipes 23 and 24. The EGR unit 60 recirculates (flows back) part of the exhaust gas, as an EGR gas, into the intake system. This EGR unit 60 further includes, as one of its essential components, an EGR pipe 61 arranged to make the intake and exhaust pipes 23 and 24 to communicate with each other at their positions close to the intake and exhaust ports. The EGR unit 60 further includes an EGR valve 62 as its one essential parts. The EGR valve 62 includes an electromagnetic valve located at a given position of the intake pipe 23, which is more downstream than the throttle valve 34, and adjusts its valve opening degree so that the area of the EGR pipe 61 through which the EGR gas passes is adjusted, which is referred to as an EGR ratio defined as the ratio of the EGR gas (to be returned to each cylinder) to the overall exhaust gas.

Specifically, the EGR pipe 61, which is the passage connecting the intake and exhaust passages, has a branch located at its given upstream position close to the exhaust pipe, at which the pipe 61 is branched into the passages 61a and 61b, and has a confluence located at its given downstream position close to the intake pipe, at which the passages 61a and 61b run together. The confluence is connected to the intake pipe via the EGR valve 62. Of the branched passages, one passage 61a is provided with a water-cooled type of EGR cooler 63 that uses cooling water to cool down the EGR gas passing therethrough. This cooling action makes it possible that the amount of heat to be dissipated due to the gas passing from the branched portion to the confluent portion differs from each other between the two branched passages 61a and 61b.

At the confluent portion of the branched passages 61a and 61b, a bypass valve 61c is provided, which varies the gas-passing cross-sectional area (i.e. how much the passage is closed (or opened)) of one of the branched passages 61a and 61b is variable and that of the other passage is opened. The EGR unit 60 is designed to decide the circulation path for the exhaust gas, depending on the open/close state of the bypass valve 61c. For example, assume that the exhaust temperature is 500° C. In this case, when the branch passage 61a is selected as the circulation passage, the EGR cooler 63 cools the EGR gas down to nearly 100° C. Meanwhile, the other branch passage 61b is selected, the EGR cooler 63 does not cool down the EGR gas, so that the EGR gas is maintained at nearly 300° C. In this way, the EGR unit 60 is able to recirculate part of the exhaust gas to the intake system via the EGR pipe 61, reducing the combustion temperature, thus suppressing the NOx production. In addition, by selecting the circulation passages using the bypass valve 61c and variably controlling the gas-passing cross-sectional area, the intake air temperature can be adjusted in a controlled manner. When the EGR valve 62 is completely closed, the EGR pipe 61 is shut down so that the EGR amount becomes zero.

The vehicle, on which the engine 10 is mounted, is provided with various types of sensors for controlling the vehicle's behaviors, in addition to the sensors described above. Such sensors include a crank angle sensor 71 to output a crank angle signal and an accelerator sensor 72 to output an accelerator opening signal, in which both signals are expressed as electrical signals. The crank angle sensor 71 is arranged to the crank shaft of the engine 10 in order to detect both the rotational angular position of the crank shaft and the rotational speed (i.e., engine rotational speed) of the crank shaft, and outputs the crank angle signal every given crank angle range (for example, at intervals of 30° CA). The accelerator sensor 72 is arranged to detect a driver's depressing action to the accelerator and output the accelerator opening signal in which the degree of the accelerator opening is reflected.

The present combustion control apparatus is also provided with an ECU (electrical control unit) 80 which is a main part for actively controlling the engine 10. This ECU 80 also serves as an essential part of the fuel injection control apparatus according to the present embodiment. This ECU 80 is provided with a known microcomputer (not shown) that receives requests from a user (driver) and the signals detected by the foregoing various sensors to control the operating states of the engine 10. Hence, depending on the user's requests and the detected signals, the ECU 80 drives the injectors 27 as well as various actuators, with the result that the engine 10 is controlled in various optimized modes depending on conditions of the engine 10.

The microcomputer installed in this ECU 80 is basically equipped with a CPU (Central Processing Unit) performing various computations, a RAM (Random Access Memory) acting as a main memory to temporarily memorize data produced during the computations and computed results, a ROM (Read Only Memory) acting as a program memory, an EEPROM (Electrically Erasable and Programmable ROM) acting as a memory to memorize data, a backup RAM (RAM powered by a backup power supply such as an on-vehicle battery), signal processing units such as A/D converters and a clock generator, and input/output ports which are in charge of inputting/outputting signals from/to external devices. In the ROM, various programs and control maps which are needed for controlling the engine 10 are stored in advance. Such programs include a program for the fuel injection control according to the present invention. In the EEPROM, a variety of types of control data including design data of the engine 10 are previously stored.

In the present embodiment, the ECU 80 always receives the detection signals from the foregoing sensors and calculates a fuel injection amount (amount to control the engine, which is simply expressed as an "engine control amount"). In addition, the ECU 80 uses the calculated fuel injection amount to control the torque generated by the combustion at the engine 10 (which is simply expressed as "engine torque" or "output torque"). Specifically, at proper injection timing depending on the engine's current operating conditions, the ECU 80 calculates the fuel injection amount reflecting the driver's accelerator-depressing operation, and supplies the injectors 27 with an injection control signal commanding the injectors 27 to inject fuel based on the supplied fuel injection amount. Hence, in response to driven amounts (for example, valve-open period) of the respective injectors 27, the output torque of the engine 10 is controlled at a target value thereof.

Incidentally, the diesel engine performs combustion on autoignition, during which time the throttle valve 34 for the taken-in air is normally held at a specific opening (for example, full open state). Thus controlling the combustion carried out by this engine 10 is a main part of controlling the fuel injection amount.

Figure 2:
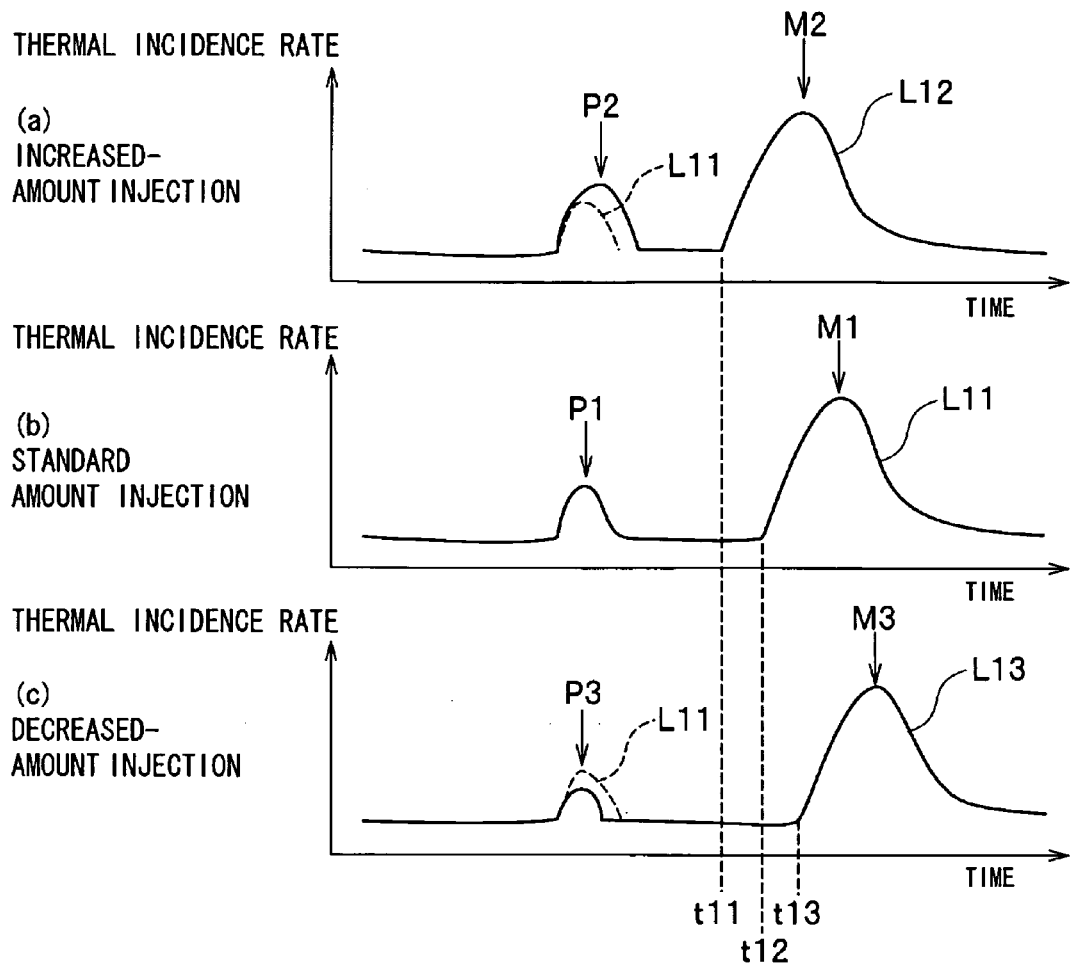
FIG. 2 illustrates timing charts showing changes in the thermal incidence rate (amount of heat generated per unit time) in response to the fuel combustion in a cylinder, which timing charts show the cases where three types of pilot injections on three different amounts of fuel to be injected (i.e., increased-amount injection, standard injection, and decreased-amount injection)
Figure 3:
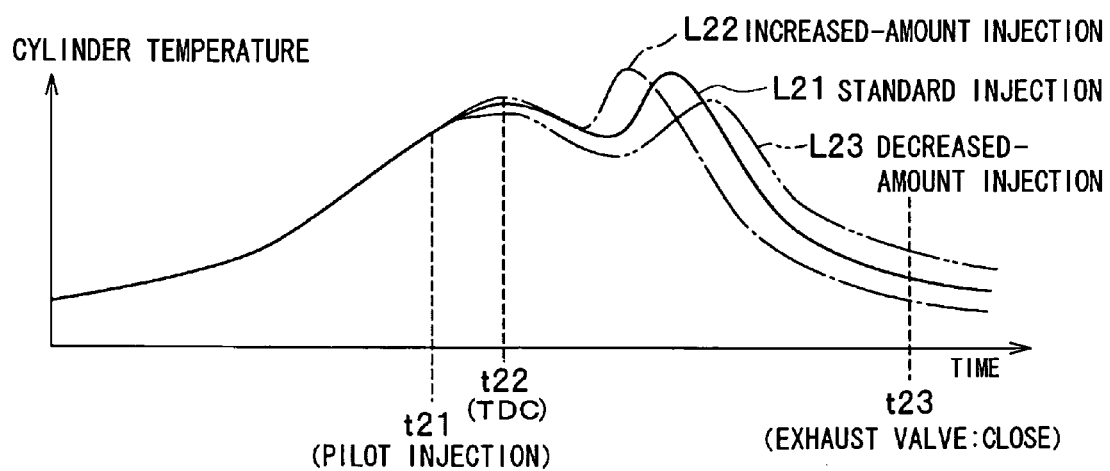
FIG. 3 is a graph showing temporal changes of the temperature within a cylinder (cylinder temperature) as to each of the three type of injections consisting of the increased-amount, standard, and decreased-amount injections.
Figure 4:
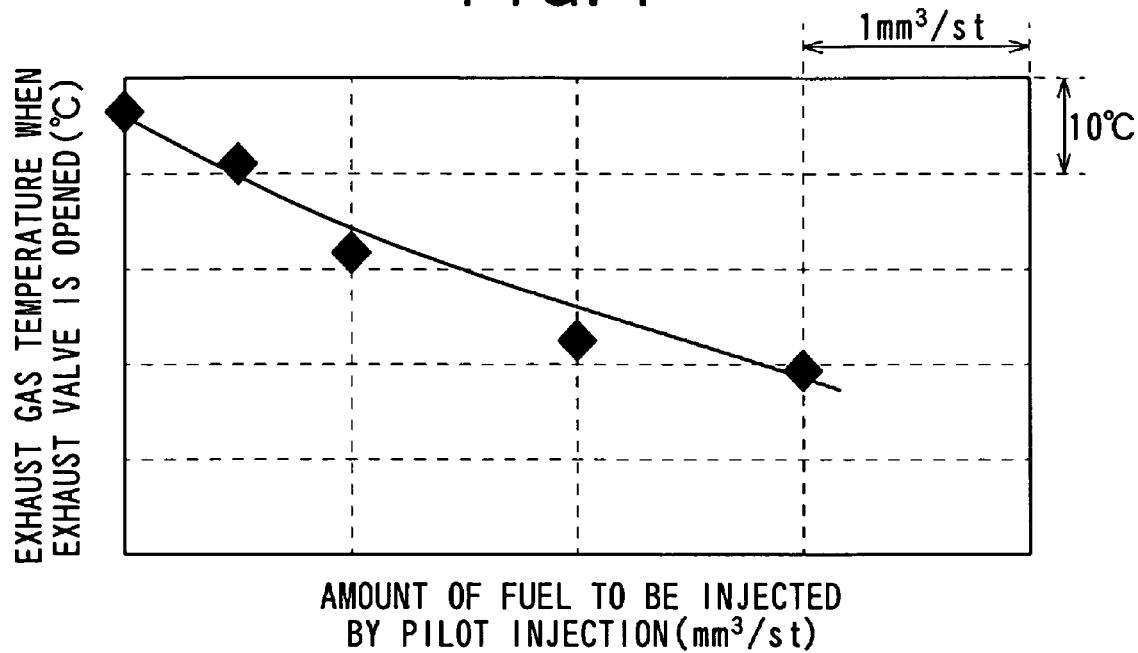
FIG. 4 is an experimental graph exemplifying the relationship between pilot injection amounts (amounts of fuel to be injected by the pilot injection) and exhaust-gas temperatures when an exhaust valve is closed.

During each of the cycles of combustion carried out by the system of the present embodiment, prior to the main injection for primarily producing the output torque, the pilot injection, that is, the preliminary sub injection which is smaller in the injection amount than the main injection is carried out. This injection way improves not only suppression of noise caused by the combustion but also reduction in NOx. In addition, in the present invention, based on the relationships between amounts of fuel to be injected (i.e., fuel injection amount) by the pilot injection and temperatures of the exhaust gas, which are shown in FIGS. 2-4, the fuel injection amount is variably set injection by injection so as to be dependent on the exhaust gas temperature. Hereinafter, the relationships, which were resultant from the experiments or others, will now be explained by referring to FIGS. 2-4, First of all, referring to FIG. 2, the relationship between the amount of fuel injected by the pilot injection (i.e., preliminary sub injection) and the ignition timing for combustion carried out by the main injection will now be described. FIG. 2 includes three graphs (a)-(c) illustrating three different types of pilot injections which consist of an increased-amount injection, a standard injection, and a decreased-amount injection. The increased-amount injection serves as a pilot injection P2 related to a main injection M2, the standard injection serves as a pilot injection P1 related to a main injection M1, and the decreased-amount injection serves as a pilot injection P2 related to a main injection M3. These three types of pilot injections are carried out using three different amounts of fuel. These graphs (a)-(c) are timing charts showing changes in a thermal incidence rate (i.e., the amount of heat to be generated per unit time) of the combustion in each cylinder 12.

As illustrated by the graphs (a)-(c) in FIG. 2, differences in the injected fuel amount of the three types of pilot injection change the ignition timing at which the following main injection will cause the combustion. Practically, the graph (b) in FIG. 2 shows a curve L11 obtained by the standard injection ("pilot injection P1") carried out based on a standard amount of fuel, which is an amount of fuel for providing a predetermined desired combustion state. According to the graph L11, the pilot injection P1 allows the combustion on the main injection M1 to start at a time t12 (that is, the ignition starts at the time t12).

Meanwhile, the graphs (a) and (c) in FIG. 2 show curves L12 and L13, which are obtained by the increased-amount injection ("pilot injection P2") and the decreased-amount injection ("pilot injection P3"), respectively. The increased-amount injection is carried out based on an amount of fuel larger than that of the standard injection by a preset amount, while the deceased-amount injection is carried out based on an amount of fuel smaller than that of the standard injection by a preset amount. As shown by the graph L12, the pilot injection P2, i.e., the increased-amount injection, allows the combustion on the main injection M2 to start at a time t11 earlier than the time t12 for the pilot injection P2, i.e., stranded injection. On the other hand, as shown by the graph L13, the pilot injection P3, i.e., the decreased-amount injection, allows the combustion on the main injection M3 to start at a time t13 later than the time t12 for the pilot injection P2, i.e., stranded injection.

Referring to FIGS. 3 and 4, the amount injected by the pilot injection and the temperature of the gas exhausted from each cylinder 12 after the combustion therein will now be described. FIG. 3 is a timing chart showing changes in the temperature in the cylinder 12 (, which is referred to as a "cylinder temperature") about the increased-amount, standard, and decreased-amount injections (pilot injections). In FIG. 3, assume that the three types of pilot injections are carried out at the time instant t21, and then the main injections are carried out at the time instant t22 or thereabouts (as to its top dead center: TDC)

FIG. 3 depicts a solid-line curve L21, a dashed-line curve L22, and a dashed-two-dotted-line curve L23 which represent combustion states of the standard, increased-amount, and decreased-amount injections, respectively. As can be seen, depending on the fuel amounts injected by the pilot injections, the ignition timing at which the main injection following the pilot injections changes. Thus, as shown by the curves L21, L22 and L23, the temperature of the exhaust gas, which is detected at a time instant t23 when the exhaust valve 22 is closed, also changes depending on the fuel amounts injected by the pilot injections. These changes can be shown as in FIG. 4, for example, in which the relationship between the fuel amounts of the pilot injection and the temperatures of the exhaust gas detected at the time instant when the exhaust valve is closed is exemplified as a graph showing actual experimental data. In FIG. 4, it is understood that the larger the amount of fuel injected by the pilot injection, the lower the temperature of the exhaust gas at the timing of closing the exhaust valve (time instant t23) (that is, the temperature of the exhaust gas discharged from each cylinder 12 after the combustion therein).

In the present embodiment, as shown by FIGS. 2-4 (especially FIG. 4), the relationships between the fuel amount injected by the pilot injection and the temperature of the exhaust gas are used such that the fuel amount given per pilot injection is set variably in accordance with the temperature of the exhaust gas. The injection control based on this variable setting of the fuel amount for each time of pilot injection will now be described with reference to FIGS. 5-10. The processes shown in FIGS. 5-8 are executed by the ECU 80, that is, the CPU implemented therein.

Figure 5:
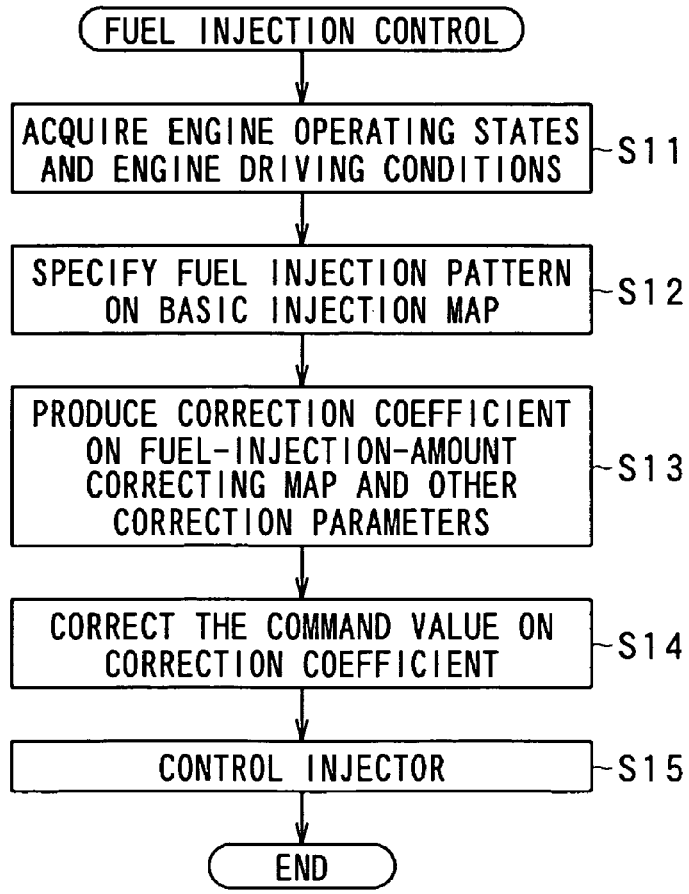
FIG. 5 is a flowchart showing the basic procedures of processing for fuel injection control.

First, referring to FIG. 5, the basic procedures of the fuel injection control according to the present embodiment will now be described. The values of various parameters used in the processes of FIG. 5 are temporarily stored in the memory devices such as RAM, EEPROM in the ECU 80, or backup RAM and updated according to need. The processes shown in FIGS. 5-9 are preformed, cylinder by cylinder, by executing programs previously stored in the ROM in the ECU 80, every predetermined range of crank angles or at predetermined intervals.

At step S11 in the series of processes shown in FIG. 5, the values of various parameters showing engine operating states and engine driving conditions are read in. The engine operating states include the current rotational speed (average rotational speed) of the engine and electric loads to the engine, whilst the engine driving conditions include a driver's operation amount of accelerator depression. At step S12, the engine driving conditions read at step S11 are used to specify the injection pattern of the fuel. This specification may involve calculation of a requested engine-driving state as occasion demands.

The injection pattern is acquired using a predetermined basic injection map previously stored in for example the foregoing ROM. Instead of the basis injection map, mathematical expressions may be used. In the case of using the basic injection map, optimum (correct) injection patterns are previously obtained as correct values by conducting experiments and/or simulations on the respective engine operating states as to presumed engine operating states, and the obtained optimum injection patterns are written into the basic injection map. Thus, the basic injection map has information in relation to the relationships between the engine operating states and the optimum injection patterns.

The injection pattern is defined by parameters showing, for example, the number of steps of injection (the number of times of injection), injection timing, duration of injection, injection-to-injection interval (interval between injections for multiple-step injections, and others. At step S12, the basis injection map is used to set, as a correct value, an optimum (correct) injection pattern so as to satisfy a requested engine-operation state depending on the current engine operating states obtained at step S11. In the single-step injection, the amount of fuel to be injected (corresponding to the duration of fuel injection) is variably set depending on requested conditions including the torque being requested. Further, in the multiple-step injections, the total amount of fuel to be injected in each injection is variably set depending on requested conditions including the torque being requested. Then, based on the optimum injection pattern, a command signal specifying a command value is produced and given to each injector 27. Accordingly, this results in that, in compliance with vehicle's running conditions, not only the pilot injection including the foregoing one, an after injection, a post injection, and others but also the main injection are conducted in an appropriate controlled manner. In the present embodiment, the processing is executed on the assumption that the pilot injection carried out in the injection pattern is only one time.

At step S13, a fuel-injection-amount correcting map, which is updated by another learning process or other means and memorized in for example the EEPROM, and other correcting parameters, which are memorized in for example the RAM and defined as an accumulated correction value K0, are read out and used to produce a correction coefficient. At step S14, the produced correction coefficient is used to correct the command value reflected in the command signal to be given to each injector 27. Finally, the processing is shifted to step S15, wherein, the corrected command signal is subjected to decision of the command values of the number of injection steps, injection timing, injection duration, injection-to-injection interval, and others, and, using the decided command values, the operation of each injector 27 is controlled.

Figure 6:
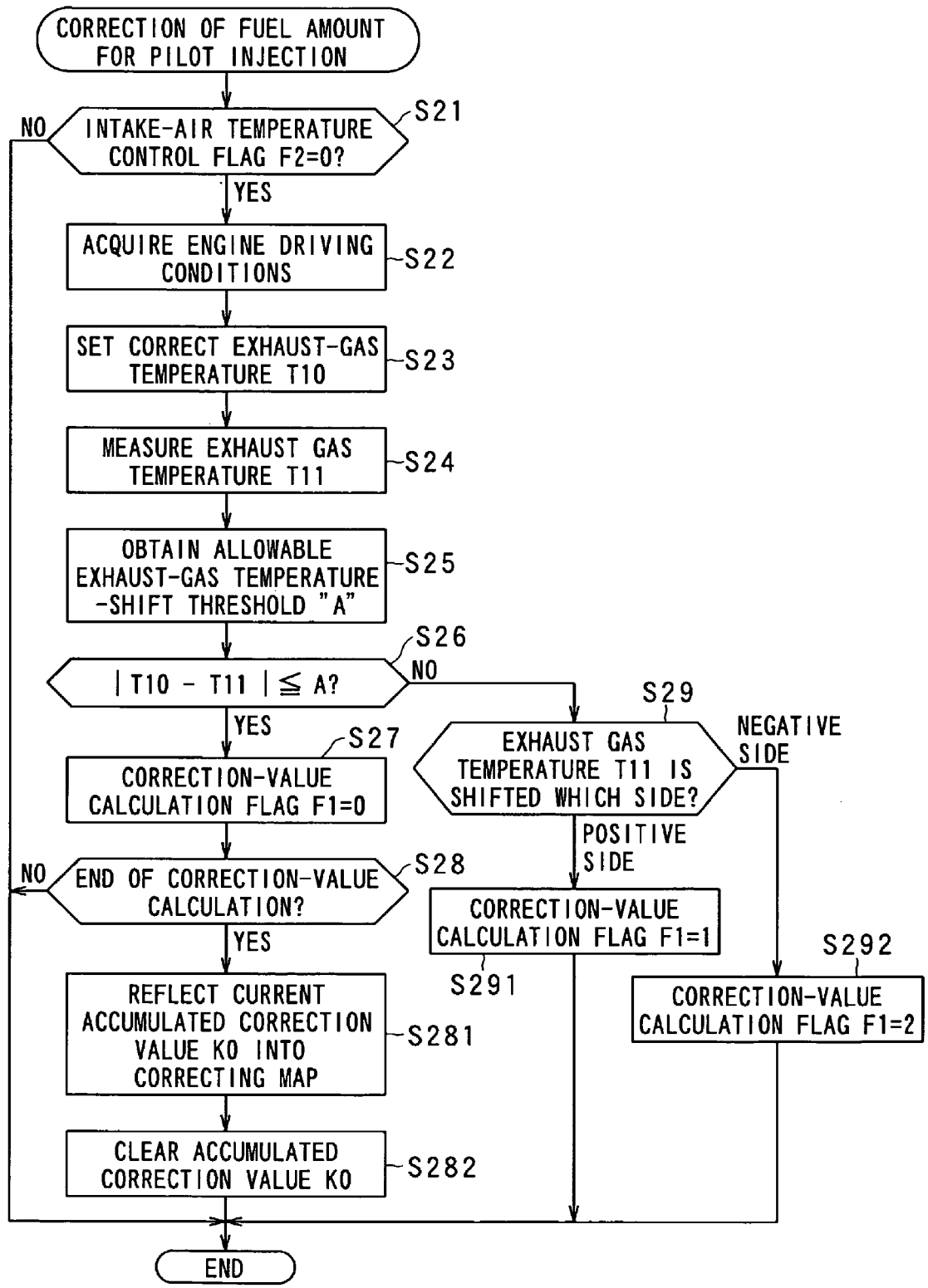
FIG. 6 is a flowchart showing the procedures of processing for correcting the pilot injection amount.
Figure 7:
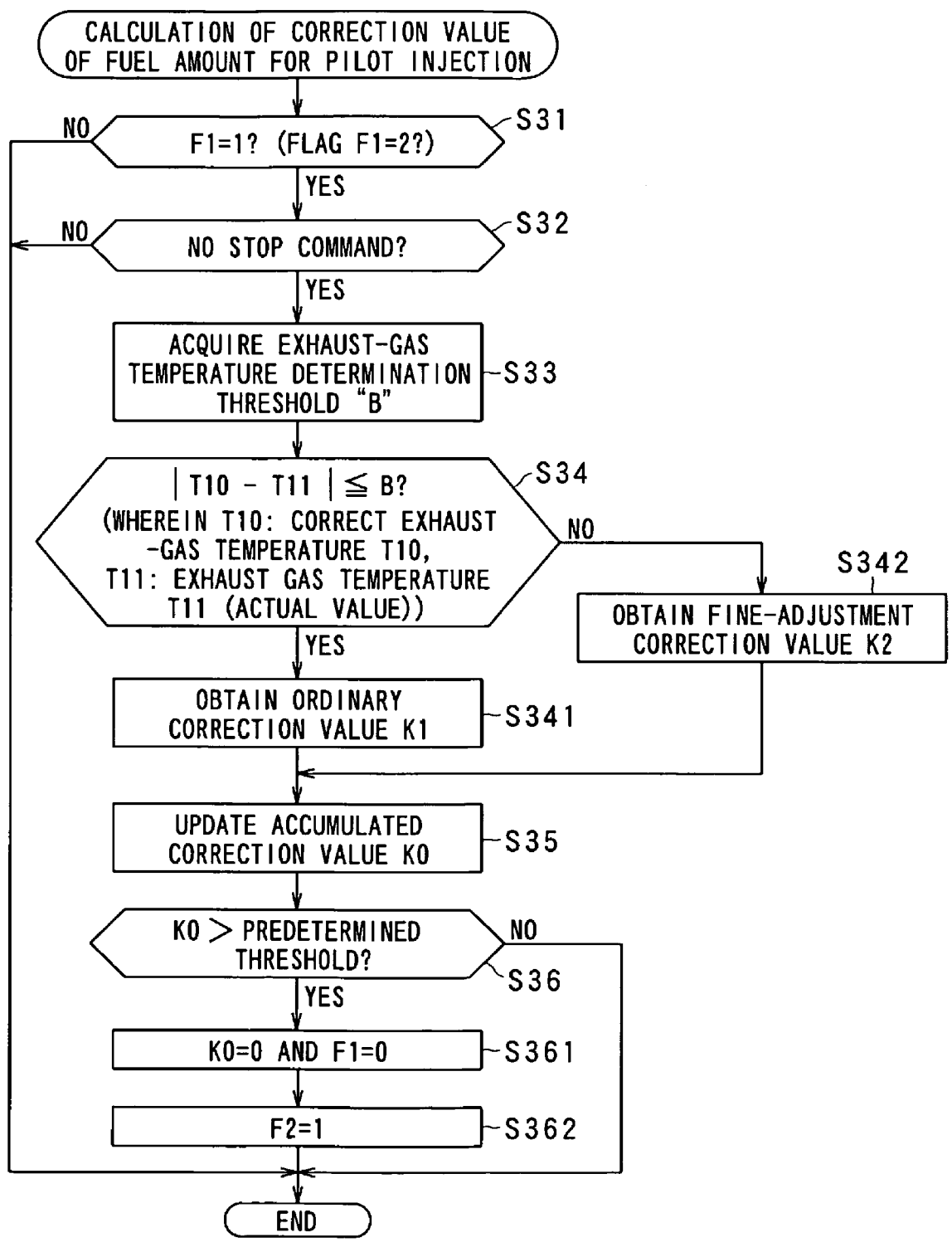
FIG. 7 is a flowchart showing the procedures of processing for calculating a correction amount to the pilot injection amount.
Figure 8:
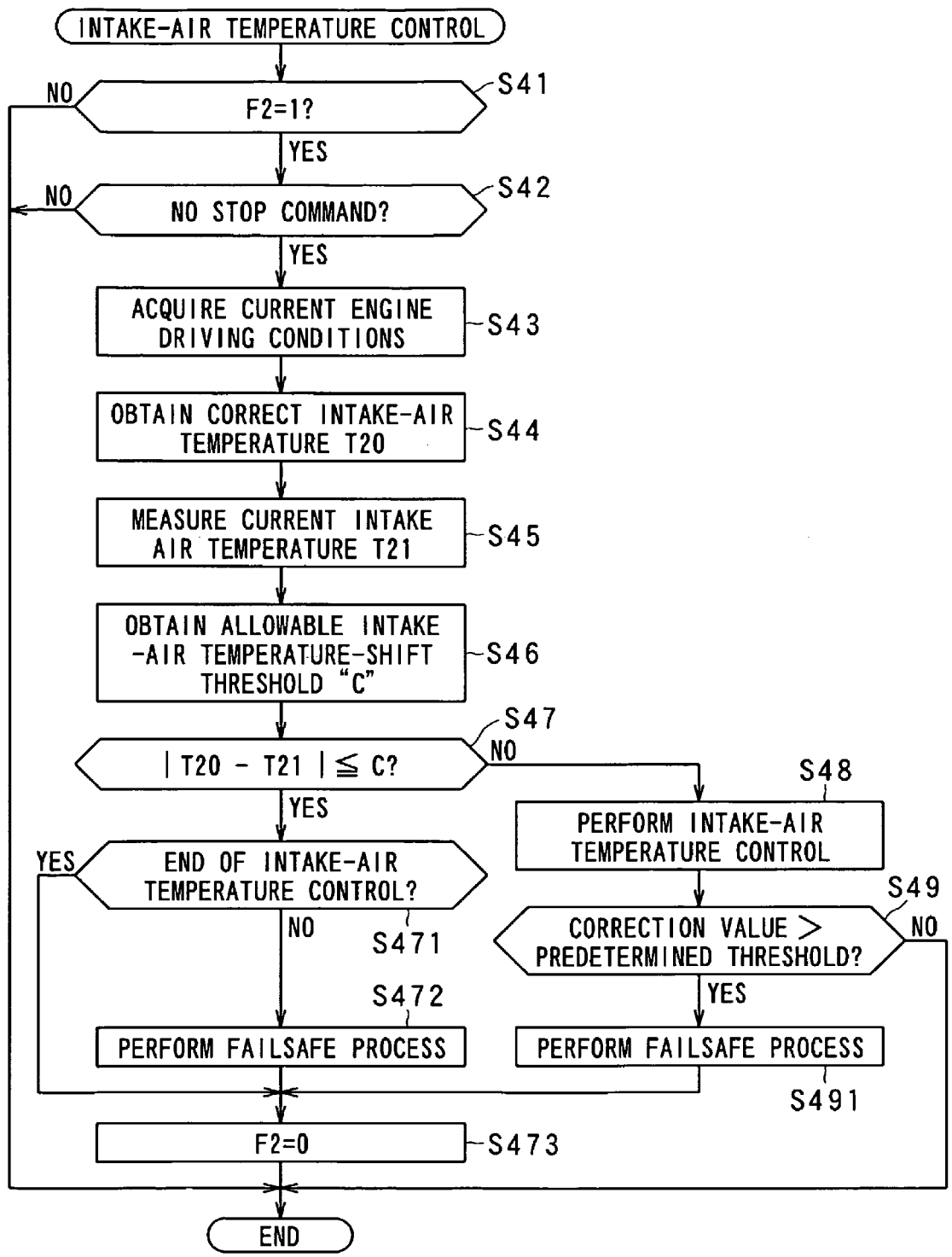
FIG. 8 is a flowchart showing the procedures of processing for performing intake-air temperature control.

FIGS. 6-10 detail how the correction coefficient used at step S14 of FIG. 3 is updated, i.e., learned. The values of various parameters appearing in the processes in FIGS. 6-8 are stored in the memory device such as RAN or EEPROM in the ECU 80 or the backup RAM according to need, and updated anytime as need arises.

The flowchart shown in FIG. 6 shows the procedures of a series of processes for correcting (optimizing) the amount of fuel injected by the pilot injection. To be specific, the procedures in FIG. 6 include, cylinder by cylinder, monitoring how much the exhaust gas temperature is shifted (that is, different) from a reference value assigned beforehand thereto and variable setting of the amount of fuel being injected by the pilot injection. This variable setting is made to enable the shift in the exhaust gas temperature to be within a predetermined allowable range previously decided for the shift, if the shift is outside the allowable range.

At step S21 shown in FIG. 6, it is determined whether or not an intake-air temperature control flag F2 is "0" which shows whether or not the intake-air temperature control is in execution. When it is determined as step S21 that this flag F2 is "0," it is recognized that the intake-air temperature control is not in execution, so that the processing is made to proceed to step S22. In contrast, when it is determined at step S21 that the flag F2 is "1," it is recognized that the intake-air temperature control is in execution. The processing is then terminated. Thus, as can be read from FIG. 6, the processes for correcting (optimizing) the fuel amount in the pilot injection is executed, provided that the intake-air temperature control is not in execution.

At step S22, the ECU 80 acquires various parameters indicating engine driving conditions including the current engine rotational speed and the current fuel injection amount (corresponding to engine load). At step S23, the acquired engine driving conditions are used to set a correct (i.e., appropriate or desired) exhaust-gas temperature T10.

Practically, the correct exhaust-gas temperature T10 is set based on a predetermined map previously stored in for example the ROM. Of course, this temperature T10 may be set using mathematical expressions. As to presumable engine operating states (for example, engine operating states decided uniquely by an engine rotational speed and a fuel injection amount), experiments or simulations are carried out to obtain correct exhaust-gas temperature T10 and their data are written in the map. Thus, the map provides relationships between the engine operating states and the correct exhaust-gas temperatures T10. In the present embodiment, this map is used to decide a correct exhaust-gas temperature T10, before another parameter is used to correct the decided correct exhaust-gas temperate T10. For example, the correction is made based on the current intake air temperature detected by the intake air temperature sensor 36, the current EGR rate calculated for the engine operating state, the current temperature of the engine body (precisely, a temperature detected using the cooling-water temperature sensor 14a), and others. At step S23, the corrected temperature is finally specified as the correct exhaust-gas temperature T10.

The processing is shifted to step S24, where the signal from the exhaust-gas temperature sensor 24b is read to measure (detect) the exhaust gas temperature T11. This detection is performed in synchronism with the valve-opening timing of the exhaust valve 22.

The processing is shifted to step S25, where the various parameters that indicate the engine driving conditions, which includes the engine rotational speed and fuel injection amount, and the correct exhaust-gas temperature T10 are used to obtain an allowable exhaust-gas temperature-shift threshold "A" showing a correct (allowable) range of exhaust gas temperatures. To obtain this threshold "A," experiments or simulations were conducted in advance to prepare a predetermined map in which an optimum value for the threshold "A" is written for every driving condition. This map previously is stored in the ROM. Instead of using the map, numerical expressions can be used to decide the optimum values for the threshold "A." The map can be used to acquire an optimum threshold "A," and the acquired threshold "A" is further corrected with other parameters including the foregoing correct exhaust-gas temperature T10.

The processing is then shifted to step S26, where how much the exhaust gas temperature T11 detected at step S24 is shifted from the correct exhaust-gas temperature T10 (the reference value) is calculated as the absolute value on an expression of |T10-T11|, and it is determined whether or not the shift value calculated from |T10-T11| is within the allowable range decided from the allowable exhaust-gas temperature threshold "A" acquired at step S25.

In cases where the amount of fuel injected by the pilot injection, in other words, the exhaust gas temperature, is normal (appropriate), it is determined at step S26 that the exhaust-gas temperature shift is within the allowable range (|T10-T11|≦A; YES at step S26). In this case, the processes at steps S27 and S28 are executed, before the processing ends. At step S27, a correction-value calculation flag F1 is set to "0." At step S28, the determination whether or not the correction-value calculation ends is made by determining whether or not the last flag F1 is set to "1" or "2." As long as the exhaust gas temperature is normal, the processes at steps S21-S28 are repeated at given processing intervals.

Meanwhile, if the exhaust gas temperature is not normal, the determination at step S26 shows |T10-T11|>A, that is, No at step S26, so that the processing is shifted to step S29. At this step, it is determined which side the exhaust gas temperature T11 is shifted (positive side or negative side) in relation to the reference value (i.e., the correct exhaust-gas temperature T10). This decides the direction of change required to correct the temperature towards to the reference value. Precisely, the correction is made in the manner that, as the exhaust gas temperature becomes higher, the amount of fuel injected by the pilot injection is controlled to a target value residing in a range commanding the fuel to be increased. At step S29, when it is determined that the correction should be made to the positive (+) side, the flag F1 is set to "1" at step S291, while if it is determined that the correction should be made to the negative (−) side, the flag F1 is set to "2" at step S292.

FIG. 7 is a flowchart showing the procedures for calculating a correction value for the amount of fuel injected by the pilot injection. This calculation is started in response to setting the correction-value calculation flag F1 to "1" or "2". Actually, the correction is made to the positive side or the negative side, separately. However, for the sake of a simplified explanation, the correction to the positive side is representative of both types of correction, except for the different points which are described in parentheses.

First, at step S31, it is determined whether or not the flag F1 is set to "1" (in the correction to the negative side, "2"). Only when the determination is YES (F1=1) at step S31, the processing is shifted to step S32 and subsequent steps therefrom.

At step S32, it is determined whether or not a command to stop the correction value calculation is issued. When the stop command is not issued yet, i.e., YES at step S32, the processing is shifted to step S33. The stop command is issued and executed as an interrupt process, when predetermined failsafe conditions are met which include conditions showing inconsistency between a commanded action and an engine state.

At step S33, a predetermined exhaust-gas temperature determination threshold "B" (for example, a fixed value, but a variable value may be used) is acquired. At step S35, the degree the exhaust gas temperature T11 detected at step S24 in FIG. 6 is shifted from the correct exhaust-gas temperature T10 (reference value) is calculated as an absolute value using an expression of |T10-T11|. Also, the calculated shift value is subjected to determination whether or not |T10-T11| is outside the range decided by the exhaust-gas temperature determination threshold "B" acquired at step S33.

When the determination at step S34 shows |T10-T11|<B, i.e., YES at step S34, it is recognized that the exhaust gas temperature T11 is shifted at a larger extent, an ordinary correction value K1 is obtained at step S341. The plus or minus sign of this value K1 depends on which way (positive side or negative side) to correct. On the other hand, if the determination at step S34 shows |T10-T11|≦B, i.e., NO at step S34, it is estimated that the exhaust gas temperature T11 is shifted at a smaller extent. In this case, a fine-adjustment correction value K2 is obtained at step S342. The plus and minus signs of this value K2 depend on which way (positive side or negative side) to correct.

The ordinary correction value K1 is decided by experiment, for example such that optimum values for this value K1 are decided for every engine rotational speed and every fuel injection amount and written in a map prepared in the ROM or others. Thus this map is used to read an optimum ordinary correction value K1 therefrom. This map may be replaced by computation of mathematical expressions. Meanwhile, the fine-adjustment correction value K2 is previously set to, for example, 0.1 mm^3/st (a correction value per stroke) so as to compensate a sustained-change degree of the fuel amount injected by the pilot injection.

At step S35, the ordinary correction value K1 or fine-adjustment correction value K2 obtained at step S341 or S342 is used to update an accumulated correction value K0. This value K0, which is stored in for example the RAM, acts as a correction coefficient for the fuel amount of the pilot injection at step S14 in FIG. 5. An initial value of "0" is given to this correction value K0. The correction value K1 or K2 is added to the accumulated correction value K0 so as to be accumulated in the positive or negative side depending on which direction correction is required. Thus, through the processes shown in FIG. 5, the amount of fuel is corrected and the pilot injection is performed with this corrected fuel amount.

Correcting the fuel amount of the pilot injection makes it possible to make the exhaust gas temperature T11 come close to or equal to the reference value, i.e., the correct exhaust-gas temperature T10. Hence, when it is determined at step S26 in FIG. 6 that the exhaust gas temperature is within the allowable range (i.e., |T10-T11|≦A), the correction-value calculation flag F1 is set to "0" at its succeeding step S27. In this case, the determination at step S28 becomes YES to show the end of calculation of the correction value (refer to step S31 in FIG. 7), and the processes at steps S281 and S282 are executed.

At step S281, the current accumulated correction value K0, which is obtained when the shifted exhaust gas temperature is within the allowable range, is made to be reflected in the fuel-injection-amount correcting map used at step S14 in FIG. 5. At step S282, the accumulated correction value K0 is cleared (K0=0), before the processing in FIG. 6 is ended. In this way, the processing in FIG. 6 is able to monitor the shift in the exhaust gas temperature, and if the shift is not in the allowable range, the fuel amount injected by the pilot injection is variably set (adjusted or controlled) so that the exhaust-gas temperature shift is kept within the allowable range.

As long as the determination at step S26 in FIG. 6 keeps |T10-T11|>A, i.e., NO at step S26, the accumulated correction value K0 is continued to be updated by steps S31-S35 in FIG. 7, resulting in that the fuel amount in the pilot injection is continually corrected by the correction value K0 at that time. That is, the value of the exhaust gas temperature T11 is used for the correction. This temperature value is made to, in an accumulated manner, change from the referenced value (i.e., correct exhaust-gas temperature T10) to its positive or negative way (side) every predetermined change amount (i.e., the ordinary correction value K1 or the fine-adjustment correction value K2), as explained in FIG. 10. Every time the exhaust gas temperature T11 is supposedly changed using the computation, it is determined at step S26 as to being allowable or not. When it is determined at step S26 that the temperature shift is allowable, an accumulated value (refer to FIG. 10) of the correction value K1 or K2 which has been added up at that time is set as an correction value to be used for the pilot injection, by updating the accumulated value in the map.

In updating the accumulated correction value K0, step S36 in FIG. 7 always determines whether or not the accumulated correction value K0 exceeds a predetermined threshold (fixed or variable value). In cases where the determination revels that the value K0 exceeds the threshold (YES at step S36), processes at steps S361 and S362 are performed. At step S361, the accumulated correction value K0 is made clear (K0=0) and the foregoing correction-value calculation flag F1 is set to "0" (F1=0). At step S362, the intake-air temperature control flag F2 is set to "1" (F2=1). Setting the flags F1=0 and F2=1, the processing in FIGS. 6 and 7 are terminated through steps S21 in FIG. 6 and S31 in FIG. 7. In addition, by setting the flag F2=1, the intake-air temperature control shown in FIG. 8 is allowed to start up.

As shown in FIG. 8, at step S41, determination is made at step S41 as to whether or not the intake-air temperature control flag F2 has been set to "1." According to this determination, only when the flag F2 is "1," the next step S42 and succeeding steps will be processed.

At step S42, it is determined whether or not a stop command to stop the intake-air temperature control has been issued. If the determination at step S42 shows no issuance of the stop command, the processing is shifted to step S43. The stop command is an interrupt command to be issued when predetermined failsafe conditions are met, as described before.

At step S43, various parameters showing the current engine driving conditions such as engine rotational speed and fuel injection amount are acquired. At step S44, a correct intake-air temperature T20 is obtained in accordance with the engine driving conditions acquired at step S43.

The processing is then shifted to step S45, where the current intake air temperature T21 is measured using the signal from the intake air temperature sensor 36. At the next step S46, the various parameters showing the current engine driving conditions obtained at step S43 and the current correct intake-air temperature T20 obtained at step S44 are utilized to obtain a threshold "C" for an allowable intake-air temperature shift. This allowable intake-air temperature-shift threshold "C" thus shows an appropriate range (allowable range) of the intake air temperature. To prepare this threshold "C," experiments are performed in advance to write, every engine driving condition, a correct value into a predetermined map. This map is produced in the ROM, for instance, but numerical expressions may be used for calculating the threshold "C" instead of the map. The threshold "C" is thus obtained using this map, and corrected on various parameters including the foregoing correct intake-air temperature T20.

The processing proceeds to step S47, where the intake air temperature T21 measured (detected) at step S45 is estimated such that the degree the temperature T21 is shifted from the correct intake-air temperature T20 (i.e., the reference value) from |T20-T21| is calculated. Further, as part of the process of step S47, it is determined that this shift amount is within an allowable range using the allowable intake-air temperature-shift threshold "C" obtained at step S46 by computing |T20-T21|≦C.

When the current intake air temperature T21 is normal (appropriate), the determination at step S47 is YES, i.e., |T20-T21|≦C is met. In this case, a further determination at step S471 is performed to determine whether or not the intake-air temperature control should be ended because of completion of this control. If the determination at step S471 reveals that the intake-air temperature control has not be performed, the ECU 80 recognizes that causes other than the intake air parameters have given rise to the shift in the exhaust air temperature, which is determined at step S26. In this case, the processes at steps S472 and S473 are performed in succession. At step S472, predetermined failsafe processes are executed, which include memorizing diagnostic codes (diag codes) into the memory such as EEPROM, lighting a warning lamp, and generating a warning beep. Further at step S473, the intake-air temperature control flag F2 is set to "0" to notify this failsafe state. After this, the processing in FIG. 8 is ended together with the end of the processing in FIGS. 6 and 7.

On the other hand, when it is determined at step S47 that the shift amount in the intake air temperature is not within the allowable range, that is, |T20-T21|>C (NO at step S47), the processing is shifted to step S48. Through the process at step S48, the intake air temperature is variably set (i.e., adjusted or controlled) so that the shift amount in the intake air temperature is kept within the allowable range. Practically, the two branch passages 61a and 61b are different in the heat dissipation amount from each other, so that the gas flow from the branched portion to the confluence portion is utilized. One of the branch passages 61a and 61b are made open, while the other undergoes the adjustment of its gas-flowing sectional area (i.e., how much the passage is closed or opened) by driving the bypass valve 61c so that the intake air temperature resides within the allowable range. For decreasing the intake air temperature, the branch passage 61a is selected as the recirculation passage, whereby the exhaust gas cooled down by the EGR cooler 63 can be recirculated into the intake air system. In contrast, for increasing the intake air temperature, the other branch passage 61b is selected, so that higher-temperature exhaust air can be re recirculated into the intake air system without using the EGR cooler 63. Additionally, through the adjustment of the opening degree of the bypass valve 61c in an accumulated manner, the gas-flowing sectional area of the branch passage 61b is adjusted every predetermined amount (fixed or variable). This makes it possible to control the intake air temperature into the allowable range with precision.

This intake-air temperature control executed at step S48 is continued under the condition that the gas-passing sectional area (i.e., the degree of closure) of the valve 61c is changed every predetermined amount, until i) it is determined at step S47 that the intake-air temperature shift falls into the allowable range, ii) it is determined at the next step S49 that the correction value (a value to be controlled) for the gas-passing sectional area becomes higher than a predetermined threshold (a fixed value or a variable value), or iii) it is determined at step S42 that the stop command has been issued.

When it is determined at step S47 that the shift in the intake air temperature is still within the allowable range, the failsafe process at step S472 is skipped, and the intake-air temperature control flag F2 is set to "0," before the processing is ended. Thus, with the intake air temperature controlled into the appropriate range, the processing in FIG. 6 is executed.

Meanwhile, if it is determined at step S49 that the correction value for the gas-passing sectional area becomes higher than the predetermined threshold, the ECU 80 recognizes that controlling the intake air temperature is no longer sufficient for appropriately controlling the intake air parameters (YES at step S49). In this case, at the next step S491, a predetermined failsafe process is executed in the same manner as described above. The intake-air temperature control flag F2 is then set to "0" in step S473, and the processing in FIG. 8 is ended.

The fuel injection control apparatus for the engine 10 operates as described above. That is, the amount of fuel supplied every pilot injection is varied (adjusted or controlled) depending on the temperature of the exhaust gas. Hence, without using the matching map and/or detecting the pressure in each cylinder, it is possible to accurately realize a desired combustion state of the engine in a simple way.

Figure 9:
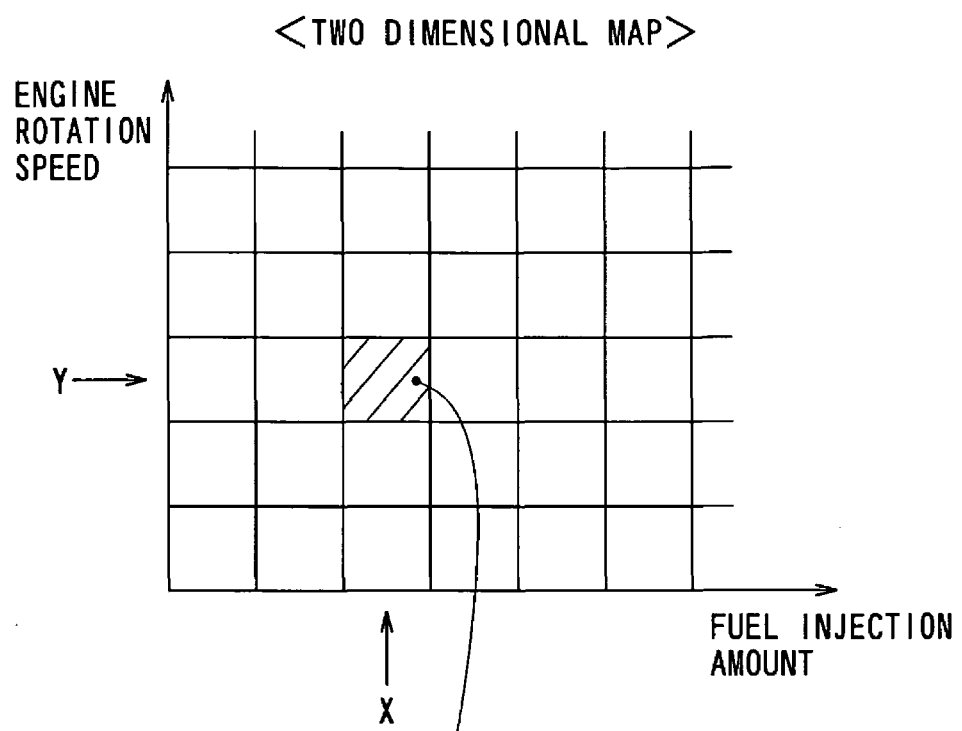
FIG. 9 is an illustration showing a map used by the apparatuses according to the embodiment.
Figure 10:
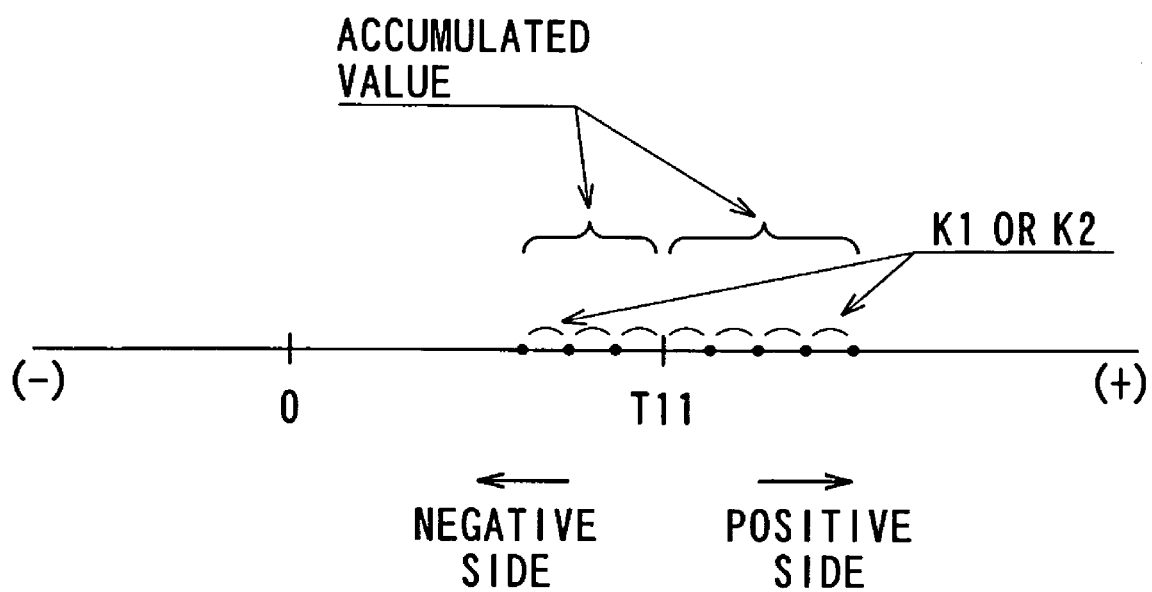
FIG. 10 is an illustration explaining how to produce a correction value.

The map used in correcting the fuel amount injected by the pilot injection is pictorially illustrated in FIG. 9. This map is for example two-dimensional map into which various parameters used by the correction are written for every engine driving condition through experiments. Those parameters in the map include the correct exhaust-gas temperature T10 allowable exhaust-gas temperature-shift threshold "A", exhaust-gas temperature determination threshold "B", ordinary correction value K1 fine-adjustment correction value K2, and accumulated correction value K0. The values of those parameters are written into the map every engine rotational speed and every fuel injection amount. When the engine rotational speeds are assigned to the "Y" axis and the fuel engine injection amounts are assigned to the "X" axis, a hatched area is uniquely selected in the map for reading pieces of information of various types of parameters.

In this way, the various maps for the control can be unified and can be used in common. Thus, even if the various types of parameters are used for the control, the common map can be managed easily. By the way, it is preferable that plural maps be prepared separately from each other, when the various parameters request that the engine driving conditions be segmented at different scales that differ significantly from each other among the parameters. This is true of the control map for the intake-air temperature control.

In the present embodiment, the fuel injection control apparatus and the fuel combustion control apparatus are able to provide advantages, which are as follows.

(1) In the engine combustion control apparatus according to the present embodiment, the temperature T11 of the exhaust gas discharged from each cylinder after the fuel combustion is detected (refer to step S24 in FIG. 6) and the detected temperature T11 is used to control the combustion state (refer to step S26 in FIG. 6). Thus the combustion state, that is, the control of the fuel injection, can be controlled more accurately and reliably.

(2) The exhaust gas temperature can indicate the current combustion state. Hence detecting the parameters indicative of the exhaust gas temperature makes it possible to control the combustion state more reliably.

(3) In addition, the amount of shift of the exhaust gas temperature T11 from its reference value (i.e., correct exhaust-gas temperature T10) is calculated as T11-T10 (refer to step S26 in FIG. 6). It is thus possible to use the shift amount to understand how much the combustion state is shifted from its appropriate state.

(4) When the shift amount is over its allowable level (i.e., the allowable exhaust-gas temperature-shift threshold "A"), the predetermined failsafe process is performed as in FIGS. 7 and 8. It is therefore possible to promptly detect the fact that a malfunction may occur at the engine, and cope with the malfunction as early as possible.

(5) In particular, the failsafe process is performed by varying the amount of fuel injected by the pilot injection during each combustion cycle. This injection control is highly effective for lowering the shift amount of the exhaust gas temperature.

(6) Further, at step S24 in FIG. 6, the exhaust gas parameter (i.e., the temperature T11) is detected at the time when the after-combustion exhaust gas is discharged from each cylinder 12. The detected exhaust-gas parameter (the temperature T11) can be used to control the combustion state at higher accuracy.

(7) Meanwhile, in relation to the engine fuel injection control apparatus which is performed by the ECU 80, the amount of fuel injected by the pilot injection is variably set (adjusted, controlled) in accordance with the temperature of the exhaust gas, as described with FIGS. 6 and 7. This eliminates the necessity of using the conventional matching map and detecting the pressure in the cylinder. The combustion can thus be controlled easily into desired states at higher precision. Accordingly, this control results in suppressing the emission of dark smoke, combustion noise, and ignition failure. Additionally, fuel consumption and emission can be improved.

(8) In the engine fuel injection control apparatus, the degree the exhaust gas temperature is shifted from its reference value (i.e., the threshold "A") is always monitored and its shift amount is subjected to the determination as to whether or not it is within the predetermined allowable range (refer to step S26 in FIG. 6). The pilot injection amount can be corrected to make the temperature shift fall into the allowable range. Thus, by detecting the exhaust-gas temperature shift, the engine combustion state can always be sustained at its appropriate level in an easier and reliable manner.

(9) The amount of fuel to be injected by the pilot injection is repeatedly changed to its positive or negative side from the reference value by a predetermined amount (refer to step S35 in FIG. 7), during which changing operations the determination is always performed as to whether or not an amount (i.e., the accumulated correction value K0) gained by accumulating the changes in the fuel amount is allowed (step S26 in FIG. 6). The accumulated amount obtained when it is determined at step S26 that the exhaust-gas temperature shift is not within the allowable range is adopted as a correction value for the pilot injection. Thus the correction value can be obtained more accurately and easily.

(10) Concerning the correction value, there are provided different plural values, that is, the ordinary correction value K1 and fine-adjustment correction value K2. Depending on by what degree the exhaust gas temperature is shifted (|T20-T21|), either one of the correction values K1 and K2 is selected as a value to change the pilot injection amount using a predetermined step size (refer to steps S34, S341, S342, and S35). This selection allows the control to be more exact, whereby the apparatus can be applied to more applications easily and reliably.

(11) The accumulated correction value K0 is determined as to whether the value K0 exceeds its allowable upper limit (refer to step S36 in FIG. 7), and the shift in the intake air temperature is determined as to whether or not this shift is within an allowable range when the value K0 exceeds the upper limit (refer to step S47 in FIG. 8). Further, when this shift is not within the allowable range, the intake air temperature is controlled to make the intake air temperature shift fall into the allowable range (refer to step S48 in FIG. 8). Thus the control can be made smoother.

(12) In the intake-air temperature control executed at step S48 in FIG. 8, the EGR unit 80 is provided, in which the two branched passages 61a and 61b are used. One of the passages 61a and 61b is opened, while the gas-passing sectional area of the other is controlled, whereby the intake air temperature is controlled into a desired temperature range.

(13) Further, the pilot injection is carried out based on the injection pattern including the one-time injection, and its amount to be injected is adjusted the correction is made such that, as the exhaust gas temperature becomes higher, an amount to be targeted by the pilot injection is adjusted to higher amounts. Thus a desired combustion state in the engine can be realized easily and reliably.

The foregoing embodiment can be modified as follows.

In the foregoing embodiment, the correction exemplified in FIG. 7 may be modified such that, depending on which way (positive side or negative side) the correction is made, the contents of the correction, such as corrected amounts, are changed, unlike the foregoing embodiment.

In the foregoing embodiment, the determination whether or not the intake-air temperature shift is within the allowable range is made at the time when it is determined that the accumulated correction value K0 exceeds the upper limit. But this is not a definitive list. For example, in the processing in FIG. 7, prior to the correction of the pilot injection amount (mainly at step S35 in FIG. 7), the foregoing determination for the intake-air temperature shift is added as a step before the step S32 in FIG. 7. If this added step detects an excessive shift of the intake air temperature outside the allowable range, the correction of the pilot injection amount is made, but in the opposite case, the correction will not be made. This also provides the similar advantages to the foregoing.

In addition, as a step before the step S22 in FIG. 6, there can be added a step to determine at intervals whether or not the intake-air temperature shift is within an allowable range. If this step reveals that the intake-air temperature shift is still within the allowable range, the correction of the pilot injection amount (step S35) is made, but in the opposite case, the correction will not be made. This also results in an accurate and reliable engine combustion control.

In this modification, when the added step shows that the intake-air temperature shift is not within the allowable range, it is preferred that the intake air temperature is adjusted so as to make the intake-air temperature shift fall into the allowed range. This keeps a desired and accurate combustion state for longer periods.

Regarding means for variably setting the intake air temperature serving as one of the intake air parameters, other means can be adopted. For example, instead of the EGR pipe 61, a branch passage may be formed at the intake passage or the exhaust passage. For example, a bypass passage can be added to the intercooler 33 serving as cooling means in the same way as the EGR cooler 63. The number of branch passages is not limited to two, but three or more branch passages may be formed. Depending other conditions except for the presence or the cooler, which include the kind of pipes, the amount of heat dissipated from the branch passages may be differentiated from each other.

In variably setting the gas-passing sectional area of the branch passage, this sectional area may be switched between completely closed and completely open selectively. Alternatively, the exhaust gas may be recirculated to the compressor's upstream in the intake air system to introduce a low-temperature inert gas (low-pressure EGR).

Furthermore, the bypass passage may not be used, and the intake air temperature may be controlled by other techniques. For instance, a sub radiator and heater (such as nichrome wire) may be used. An alternative technique is to control the temperature of the EGR gas or the EGR rate for indirect adjustment of the temperature, without directly adjusting the temperature. In this indirect temperature adjustment, a sub radiator and heater may be used.

Another modification also concerns variable setting of the pilot injection amount in the foregoing embodiment, this setting is made based on the exhaust gas temperature (indicating the state of the exhaust gas) which is a parameter showing the period of time between the ignition timing for the combustion, which is in response to the main injection, and the open timing of the exhaust valve. However, this is just one example. In place of the exhaust gas temperature, the concentration of oxygen in the exhaust gas, which is detected by the A/F sensor 38b, can be utilized. The oxygen indicates information indicative of a constituent of the exhaust gas. As the oxygen concentration becomes higher, a target value for the pilot injection amount is increased in a controlled manner.

The present inventors turned their attention to the fact fuel consumption per combustion cycle changes depending on the amount of fuel injected by the pilot injection (i.e., pilot injection amount). Thus, using the parameters (including the concentration of not only oxygen, HC or NOx) showing the fuel consumption per combustion cycle, the pilot injection amount can be controlled. Specifically, as the fuel consumption shown by those parameters becomes smaller, a target value for the pilot injection amount is increased in a controlled manner, whereby a desired combustion state can be attained easily and reliably. As to the oxygen concentration, it is not limited to a value actually measured using the oxygen concentration sensor, but may be estimated on computation from a fresh air amount, EGR rate, air excess ratio, and/or others.

Also, the relationship between the pilot injection amount and the exhaust air pressure (showing the exhaust air state) shows a similar tendency to that between the pilot injection amount and the exhaust air temperature. Thus, according to the exhaust air pressure, the pilot injection amount may be controlled in a manner that the higher the exhaust air pressure, the greater a target value for the pilot injection amount. This control also provides a desired combustion state easily and reliably.

Moreover, instead of or together with the intake air temperature, intake air parameters other than the intake air temperature may be used. For example, the pressure of the intake air may be used, or the oxygen concentration in the intake air may be used, which is detected by for example an A/F sensor installed in the intake air system. Like the intake air temperature, the intake air pressure or the intake-air oxygen concentration is subjected to the determination in the same way as the foregoing.

As a substitute for the pilot injection amount, the injection timing of the pilot injection may be controlled, which is also for controlling the combustion state. This control is based on the fact that as the timing of the pilot injection is shifted from its reference timing, the ignition timing is delayed. This relationship may be mapped based on, for example, computation, or experiments if combustion modes become complex due to changes in the pilot injection timing.

The preliminary sub injection according to the present invention is not limited to the pilot injection, provided that the preliminary sub injection precedes the main injection and is performed at a fuel amount smaller than that of the main injection. Instead of or together with the pilot injection, such preliminary sub injections may be performed, which include a pre-injection or a preparation injection which can be distinguished from the pilot injection.

The injection pattern for the pilot injection will not be limited to one time of injection, but may be modified to injection patterns which provides a plurality of times of preliminary sub injections. In such a case, it is preferred that the injection amount and injection timing of each of the plurality of times of injections or intervals between the injections can be variably set (i.e., controlled or adjusted) depending on information from the exhaust air parameters.

Further, the pilot injection amount may be variably set depending on information shown by not only the exhaust air parameters, such as exhaust air temperature, but also the intake air parameters, such as intake air temperature. This setting method is also preferred in providing a desired accurate combustion state.

Moreover, for the purpose of improving control accuracy more, the injection control that uses the preliminary sub injection executed based on the exhaust gas parameters may be combined with, if required, injection control based on the conventional matching map or the detection of cylinder pressure.

In the foregoing embodiment, in order to obtain an exhaust parameter indicating the combustion state at higher accuracy, the measurement (detection) of the exhaust gas parameters is synchronized with opening the exhaust valve 22, as in FIG. 2, step S24. This is not a definitive manner, however. An alternative manner is to consecutively detect the exhaust gas parameter a plurality of times during one combustion cycle, and an average is computed over the plurality of detected values for use in the fuel combustion control.

On the other hand, in the engine combustion control apparatus according to the present invention, a program may be implemented which uses the exhaust gas parameters (i.e., temperature, pressure, constituents, or others of the exhaust gas) obtained at step S24 in FIG. 6 in order to obtain combustion parameters showing states of the combustion producing the torque. The combustion parameters can be defined as parameters showing that factors such as combustion stability are present at which level in this configuration, the combustion states, in other words, combustion characteristics of the engine 10, can be found easily. In particular, a display device can be provided so that the combustion parameters on the display device are visible to the user (e.g., the driver in the vehicle).

Furthermore, of the programs shown in FIGS. 5-8, only regarding the program relating to step S24 in FIG. 6 may be linked with another program for obtaining a current exhaust gas parameter at the time when the exhaust gas is exhausted from each cylinder 12 after the combustion. The obtained exhaust gas parameter may be converted into a combustion parameter by a user (e.g., serviceperson), which also allows the user to understand the combustion characteristics of the engine to be used. Hence it is possible to detect malfunctions of an engine as early as possible, and to take appropriate countermeasures against such malfunctions.

As to the type of the engine, the present invention is not limited to the foregoing one. For example, a spark-ignition gasoline engine is also a target to which the control of the present invention is applied. In addition, appropriate changes may be added to the configuration of the combustion control apparatus depending on the application. For example, the intake-air/exhaust-gas temperature sensor the intake-air/exhaust-gas pressure sensor, the oxygen concentration sensor for the intake air and exhaust gas may be positionally changed at cylinder's positions close to the intake and exhaust ports thereof so as not to largely affect the objects to be sensed.

Additionally programs for estimating the changes in the properties to be sensed may be implemented separately, so that the sensors can be arranged at positions at which the properties cause larger changes. To arrange these sensors in the branch passage of the intake pipe or exhaust pipe directed to each cylinder is just one example. These sensors may be located at one of pipe positions from each of which the intake pipe or the exhaust pipe is branched to each cylinder. These sensors may be arranged for one or more of the cylinders (for example, one cylinder), in which outputs from those sensors are used to estimate, on computation, the parameters for controlling the remaining cylinders. In short, the system configurations can be changed, as long as the intake-air/exhaust-gas parameters showing the combustion state are acquired.

In the foregoing embodiment and modifications, various types of software programs are used, but circuitry dedicated to the processing functionally realized by the programs, for example logic circuits, may be utilized instead of the programs.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for controlling injection of fuel into an engine with a combustion chamber, wherein the fuel is injected into the combustion chamber as a preliminary sub injection and a main injection following the preliminary sub injection, the preliminary sub injection repeating one or more times and being less in an amount of the fuel than the main injection, the apparatus comprising:

acquisition means that acquires at least one of first and second parameters, the first parameter showing a state of an exhaust gas exhausted from the cylinder after the combustion of the fuel, the second parameter showing information in relation to a constituent of the exhaust gas; and a control unit that includes variably setting means for variably setting a mode of the preliminary sub injection depending on the at least one of first and second parameters acquired by the acquisition means.

2. The apparatus of claim 1, wherein the control unit comprises detection means for detecting a shift in a value of the at least one of first and second parameters from a predetermined reference value previously set as for the shift;

exhaust determining means for determining whether or not the detected shift is within a predetermined allowable range previously set as for the shift; and mode correcting means for correcting the mode of the preliminary sub injection so that the shift of the value of the at least one of first and second parameters falls into the predetermined allowable range, when the determining means determine that the shift is outside the allowable range.

3. The apparatus of claim 2, wherein the control unit comprises performing means for performing the determination whether or not the detected shift is within the predetermined allowable range while a specific parameter for the mode of the preliminary sub injection is changed, every a predetermined change amount, from a reference value in relation to the specific parameter to either a positive or a negative side of the reference value so as to accumulate the predetermined change amount every time the change is made; and correction value setting means for setting a correction value to a parameter indicating the mode of the preliminary sub injection, the correction value being an accumulated value of the predetermined change amount decided when the exhaust determining means determined that the shift is within the predetermined allowable range.

4. The apparatus of claim 3, wherein the control unit comprises selection means for selecting, as the predetermined change amount, one among mutually different plural values depending on how large the shift in the value of the at least one of first and second parameters is.

5. The apparatus of claim 3, comprising further acquisition means that acquires at least one of third and fourth parameters, the third parameter showing a state of an intake air taken in for the combustion in the engine, the forth parameter showing a constituent of the intake air, wherein the control unit comprises accumulation determining means for determining whether or not the accumulated value of the predetermined change amount exceeds an upper limit set as for the accumulated value;

further detection means for detecting a shift in a value of at least one of third and fourth parameters from a predetermined reference value previously set as for the shift, when the accumulation determining means determines that the accumulated value exceeds the upper limit;

intake determining means for determining whether or not the shift detected by the further detection means is within a predetermined allowable range previously set as for the shift;

parameter control means for controlling at least one of third and fourth parameters so that the shift detected by the further detection means falls into the predetermined allowable range, when the intake determining means determines that the shift is outside the predetermined allowable range.

6. The apparatus of claim 3, wherein
the engine comprises an intake/exhaust system including a plurality of branch passages branched at a predestined position of one of an intake passage, an exhaust passage, and an connected portion of intake/exhaust passages and joined at a downstream position of the intake passage, wherein at least two of the plurality of branch passages are mutually different in a heat dissipation amount based on differences in gas flow from the branched position to the joined position, and
the parameter control means is adapted to adjust a gas-passing sectional area of at least one of the at least two branch passengers.

7. The apparatus of claim 6, wherein the plurality of branch passages are formed in an EGR (Exhaust Gas Recirculation) passage to recirculate part of the exhaust gas to the intake passage and the at least two passages are different in the heat dissipation amount from each other based on presence of a cooler arranged in the at least two passages.

8. The apparatus of claim 1, wherein the preliminary sub injection is carried out one time, and the variably setting means is adapted to variably set at least one of an mount of the fuel to be injected by the preliminary sub injection and a timing of the preliminary sub injection depending on a content of the at least one of first and second parameters acquired by the acquisition means.

9. The apparatus of claim 8, wherein the at least one of first and second parameters acquired by the acquisition means is a parameter in which an interval between an ignition time for the combustion in response to the main injection and an opening time of an exhaust valve of the engine.

10. The apparatus of claim 9, wherein the at least one of first and second parameters acquired by the acquisition means is a temperature of the exhaust gas exhausted after the combustion and the parameter control means is adapted to control the amount of the fuel to be injected by the preliminary sub injection to a target value of the amount, the target value being greater as the temperature of the exhaust gas becomes higher.

11. The apparatus of claim 9, wherein the at least one of first and second parameters acquired by the acquisition means is a pressure of the exhaust gas exhausted after the combustion and the parameter control means is adapted to control the amount of the fuel to be injected by the preliminary sub injection to a target value of the amount, the target value being greater as the pressure of the exhaust gas becomes higher.

12. The apparatus of claim 1, further comprising
preliminary determining means for determining, prior to the variable setting of the mode of the preliminary sub injection, whether or not a shift in a value of a further parameter from a reference value set to the shift is within a predetermined allowable range set to the shift, the shift indicating at least one of a state of intake air supplied for the combustion of the engine and a constituent of the intake air,
wherein the parameter control means is adapted to variably set the mode of the mode of the preliminary sub injection, when the preliminary determining means determines that the shift in the value of the further parameter is within the predetermined allowable range.

13. The apparatus of claim 12, further comprising
preliminary variable setting means for variably setting, prior to the variable setting of the mode of the preliminary sub injection, the further parameter such that the shift of the value of the further parameter falls into the predetermined allowable range, when the preliminary determining means determines that the shift in the value of the further parameter is outside the predetermined allowable range.

14. An apparatus for controlling a combustion state of fuel in a cylinder of an engine equipped with an output shaft driven to rotate by torque generated by the combustion of the fuel, comprising:
acquisition means for acquiring at least one of first and second parameters, the first parameter showing a state of an exhaust gas exhausted from the cylinder after the combustion of the fuel, the second parameter showing information in relation to a constituent of the exhaust gas; and
setting means for setting the at least one of first and second parameters acquired by the acquisition means such that the at least one of first and second parameters is able to be used for the control of the combustion state of the fuel.

15. An apparatus for controlling a combustion state of fuel in a cylinder of an engine equipped with an output shaft driven to rotate by torque generated by the combustion of the fuel, comprising:
first acquisition means for acquiring at least one of first and second parameters, the first parameter showing a state of an exhaust gas exhausted from the cylinder after the combustion of the fuel, the second parameter showing information in relation to a constituent of the exhaust gas; and
second acquisition means for acquiring a third parameter showing the combustion state of the fuel based on the at least one of first and second parameters acquired by the first acquisition means.

16. An apparatus for controlling a combustion state of fuel in a cylinder of an engine equipped with an output shaft driven to rotate by torque generated by the combustion of the fuel, comprising:
acquisition means for acquiring at least one of first and second parameters, the first parameter showing a state of an exhaust gas exhausted from the cylinder after the combustion of the fuel, the second parameter showing information in relation to a constituent of the exhaust gas;
calculation means for calculating a difference between the at least one of first and second parameters acquired by the acquisition means and a predetermined reference value previously assigned to the difference: and
control means for controlling the combustion of the fuel based on a result calculated by the calculation means.

17. The apparatus of claim 16, wherein the control means includes failsafe performing means for performing a predetermined failsafe process in cases where the difference calculated by the calculation means is over than a predetermined allowable level.

18. The apparatus of claim 17, wherein the fuel is injected into the cylinder during each combustion cycle by a preliminary sub injection repeated one or more times and a main injection following the preliminary sub injections and primarily producing the torque, the preliminary sub injection being less in an amount of the fuel to be injected than the main injection, and
the failsafe process is a process to variably set a mode of the preliminary sub injections.

19. The apparatus of claim 14, wherein the acquisition means is adapted to acquire the at least one of first and second parameters at each time the exhaust gas is exhausted from the cylinder.

20. The apparatus of claim 14, wherein the state of the exhaust gas is expressed by at least one of a pressure of the exhaust gas and a temperature of the exhaust gas.

21. A method of controlling injection of fuel into an engine with a combustion chamber, wherein the fuel is injected into the combustion chamber as a preliminary sub injection and a main injection following the preliminary sub injection, the preliminary sub injection repeating one or more times and being less in an amount of the fuel than the main injection, the method comprising:

acquiring at least one of first and second parameters, the first parameter showing a state of an exhaust gas exhausted from the cylinder after the combustion of the fuel, the second parameter showing information in relation to a constituent of the exhaust gas; and variably setting a mode of the preliminary sub injection depending on the at least one of the acquired first and second parameters.

22. A method of controlling a combustion state of fuel in a cylinder of an engine equipped with an output shaft driven to rotate by torque generated by the combustion of the fuel, the method comprising:

acquiring at least one of first and second parameters, the first parameter showing a state of an exhaust gas exhausted from the cylinder after the combustion of the fuel, the second parameter showing information in relation to a constituent of the exhaust gas; and second acquisition means for acquiring a third parameter showing the combustion state of the fuel based on the at least one of acquired first and second parameters.

* * * * *